(12) United States Patent
Vemireddy et al.

(10) Patent No.: US 11,899,822 B2
(45) Date of Patent: Feb. 13, 2024

(54) PRIVATE, SECURE TRAVEL SYSTEM

(71) Applicant: Bank of America Corporation, Charlotte, NC (US)

(72) Inventors: Vijaya L. Vemireddy, Plano, TX (US); Kevin A. Delson, Woodland Hills, CA (US)

(73) Assignee: Bank of America Corporation, Charlotte, NC (US)

( * ) Notice: Subject to any disclaimer, the term of this patent is extended or adjusted under 35 U.S.C. 154(b) by 696 days.

(21) Appl. No.: 16/934,219

(22) Filed: Jul. 21, 2020

(65) Prior Publication Data

US 2022/0027510 A1 Jan. 27, 2022

(51) Int. Cl.
| | |
|---|---|
| *G06F 21/62* | (2013.01) |
| *H04L 9/40* | (2022.01) |
| *G06Q 10/02* | (2012.01) |
| *G06Q 20/38* | (2012.01) |
| *G06Q 30/0645* | (2023.01) |
| *G06Q 30/018* | (2023.01) |

(Continued)

(52) U.S. Cl.
CPC ....... *G06F 21/6254* (2013.01); *G06Q 10/025* (2013.01); *G06Q 20/383* (2013.01); *G06Q 30/0185* (2013.01); *G06Q 30/0645* (2013.01); *G06Q 50/14* (2013.01); *H04L 63/0846* (2013.01); *H04L 63/0884* (2013.01); *G06Q 40/02* (2013.01); *H04L 63/0838* (2013.01)

(58) Field of Classification Search
CPC ............. G06F 21/6254; G06Q 10/025; G06Q 20/383; G06Q 30/0185; G06Q 30/0645; G06Q 50/14; G06Q 40/02; H04L 63/0846; H04L 63/0884; H04L 63/0838
See application file for complete search history.

(56) References Cited

U.S. PATENT DOCUMENTS

| | | | | |
|---|---|---|---|---|
| 5,948,040 | A | * | 9/1999 | DeLorme ............... G06Q 10/02 701/426 |
| 6,119,096 | A | * | 9/2000 | Mann ..................... G06Q 10/02 705/40 |

(Continued)

OTHER PUBLICATIONS

"The Known Traveller: Unlocking the Potential of Digital Identity for Secure and Seamless Travel," http://www3.weforum.org/docs/WEF_The_Known_Traveller_Digital_Identity_Concept.pdf, World Economic Forum, Jan. 2018.

(Continued)

*Primary Examiner* — Sharon S Lynch
(74) *Attorney, Agent, or Firm* — Weiss & Arons LLP

(57) ABSTRACT

A system for providing private, secure travel is provided. The system may include a transceiver. The transceiver may be operable to receive and transmit communication from and to a plurality of travelers and a plurality of service providers. The system may include an itinerary booking module. The itinerary booking module may process itinerary communications received from the plurality of travelers. The itinerary booking module may determine a plurality of legs included in each received itinerary. The itinerary booking module may book, via the transceiver, at least one service provider for each leg of each itinerary. The system may include a unique identifier generator. The unique identifier generator may generate a unique identifier for each of the plurality of travelers.

15 Claims, 11 Drawing Sheets

(51) Int. Cl.
*G06Q 50/14* (2012.01)
*G06Q 40/02* (2023.01)

(56) References Cited

U.S. PATENT DOCUMENTS

| | | | | |
|---|---|---|---|---|
| 6,959,298 | B1* | 10/2005 | Silverbrook | G06Q 20/108 |
| | | | | 707/999.102 |
| 7,117,183 | B2* | 10/2006 | Blair | G06Q 20/105 |
| | | | | 705/75 |
| 7,599,847 | B2* | 10/2009 | Block | G06Q 10/02 |
| | | | | 235/375 |
| 7,797,170 | B2* | 9/2010 | Bodin | G06Q 20/10 |
| | | | | 455/154.1 |
| 8,140,256 | B1* | 3/2012 | dos-Santos | G06Q 50/188 |
| | | | | 701/527 |
| 10,108,618 | B2* | 10/2018 | Vlugt | G06Q 10/025 |
| 10,366,250 | B1* | 7/2019 | Chen | G06F 21/6245 |
| 10,366,354 | B2* | 7/2019 | Lippow | G06Q 30/0625 |
| 11,397,904 | B2* | 7/2022 | Lippow | G06Q 30/0625 |
| 11,689,781 | B2* | 6/2023 | Brody | H04N 21/4524 |
| | | | | 725/32 |
| 2002/0100803 | A1* | 8/2002 | Sehr | G07F 7/1008 |
| | | | | 235/384 |
| 2002/0111845 | A1* | 8/2002 | Chong | G06Q 10/06311 |
| | | | | 705/7.13 |
| 2003/0040946 | A1* | 2/2003 | Sprenger | G06Q 30/06 |
| | | | | 705/6 |
| 2004/0210476 | A1* | 10/2004 | Blair | G06Q 20/102 |
| | | | | 705/13 |
| 2004/0220854 | A1* | 11/2004 | Postrel | G06Q 30/02 |
| | | | | 705/14.66 |
| 2013/0179957 | A1* | 7/2013 | Takata | H04L 9/3231 |
| | | | | 726/7 |
| 2013/0346124 | A1* | 12/2013 | Stern | G06Q 10/025 |
| | | | | 705/6 |
| 2015/0161528 | A1* | 6/2015 | Yalcin | A61K 8/9789 |
| | | | | 705/5 |
| 2016/0171395 | A1* | 6/2016 | Lippow | G06Q 10/025 |
| | | | | 705/6 |
| 2016/0378874 | A1* | 12/2016 | Jafri | G06Q 30/0207 |
| | | | | 707/706 |
| 2019/0325357 | A1* | 10/2019 | Lippow | G06Q 30/0625 |
| 2020/0211031 | A1* | 7/2020 | Patil | G06Q 20/14 |
| 2020/0389450 | A1* | 12/2020 | Levitt | G06Q 20/385 |
| 2022/0035950 | A1* | 2/2022 | Wakabayashi | H04L 9/50 |

OTHER PUBLICATIONS

"Travel Identity of the Future," https://www.sita.acro/resources/type/white-papers/travel-identity-of-the-future, SITA, 2016.

* cited by examiner

PRIVATE, SECURE TRAVEL SYSTEM

FIELD OF TECHNOLOGY

Aspects of the disclosure relate to systems for enhancing travel security.

BACKGROUND OF THE DISCLOSURE

Increasing travel security has become more important in recent years. Travel service providers, such as hotels, airlines and car rentals may be located in various locations around the globe. These travel service providers cannot consistently be relied upon to protect a traveler's privacy and personally identifiable information. As such, a traveler's personally identifiable information, such as the traveler's name and credit card information may become vulnerable when the traveler uses personally identifiable information to book an itinerary, and when the traveler uses personally identifiable information while en route.

Conventionally, there is no recourse but for the traveler to provide personally identifiable information to travel service providers. Specifically, many travel service providers require personally identifiable information, such as name and credit card data, to book an itinerary. Many travel service providers also require personally identifiable information in order to secure a rented item, such as a hotel room or rental car, against incidental damage.

Therefore, a system that protects a traveler's anonymity and provides a surety for the service providers would be desirable.

SUMMARY OF THE DISCLOSURE

A method for implementing a private, secure travel itinerary is provided. The method may include receiving the itinerary from a traveler. The itinerary may include a plurality of legs. Each leg may include a first location, a second location and a method of transportation from the first location to the second location. Each leg may also include details relating to lodging at the second location. Such details may include hotel room and car rental details.

The method may also include transmitting the itinerary to a PACT central processing system. A PACT central processing system may be a system that can vouch for the reliability of a traveler. The PACT central processing system may have access to financial accounts of the traveler. The PACT central processing system may also include the ability to rate the reliability of the traveler. As such, in the event that the traveler fails to complete the itinerary, the PACT central processing system may ensure that travel service providers are compensated. Also, in the event that the traveler is causes damage during the journey documented by the itinerary, the PACT central processing system may transmit identifying documentation to the travel service providers. Additionally, in the event that a traveler fails to arrive, the PACT central processing system may lower the traveler's reliability rating. As such, it may become difficult for the traveler to use the PACT central processing system to book an itinerary at a different time.

The PACT central processing system may generate a unique anonymous identifier. The unique anonymous identifier may identify both the itinerary and the traveler. In some embodiments, the unique identifier may only identify the traveler. As such, the unique identifier may be reusable for multiple itineraries. In certain embodiments, the unique identifier may be dynamic. As such, the unique identifier may change for each leg in the journey, or after a predetermined time period.

In some embodiments, the unique identifier may include a biometric identifier. The biometric identifier may be associated with the traveler or bearer of the identifier.

The PACT central processing system may anonymously book, with a service provider, the identifier for each leg included in the itinerary. The anonymous booking may include transmitting the identifier to the service provider. The anonymous booking may also include transmitting the leg of the itinerary to the service provider. In some embodiments, the anonymous booking may include reserving a specific item without transmitting an identifier.

The PACT central processing system may transmit the following to the traveler: the unique identifier and a plurality of details relating to the one or more service providers.

A service provider may receive electronic input from the traveler. The electronic input may correspond to the unique identifier. The service provider may validate the received unique identifier with the PACT central processing system. In some embodiments, the service provider may have received the unique identifier. In such embodiments, the service provider may validate the unique identifier absent any involvement from the PACT central processing system.

In certain embodiments, the service providers may delete the unique identifier from service provider records upon successful completion of a service provided by the service provider.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
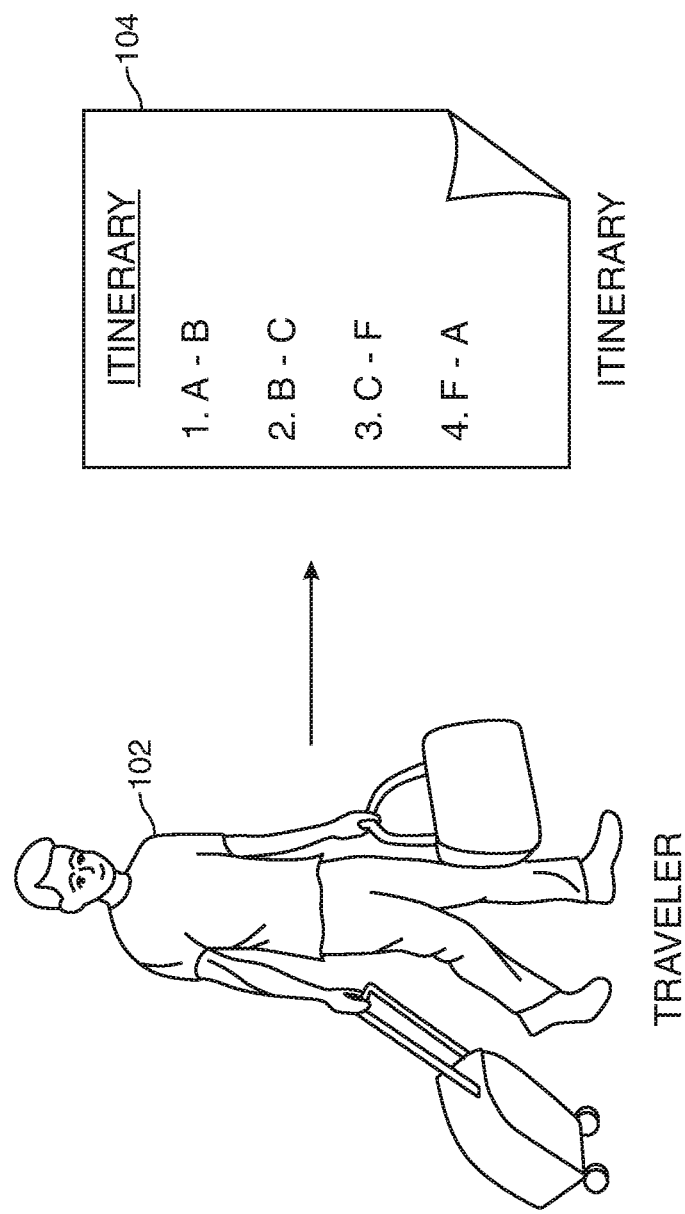
FIG. 1 shows an illustrative diagram in accordance with principles of the disclosure.

Apparatus and methods for implementing a private, secure travel itinerary is provided.

A pact central processing system for private, secure travel itinerary implementation may also be provided. The system may include a transceiver. The transceiver may be operable to receive and transmit communications to a plurality of travelers and a plurality of service providers. The transceiver may be operable to receive itinerary communications from a traveler. An itinerary communication may include a schedule of events relating to planned travel. The itinerary may include locations to be visited at specific times and methods of transportation to move between locations. The itinerary may comprise a plurality of legs. Each of the legs may correspond to the travel between a first location and a second location.

The pact central processing system may also include an itinerary booking module. The itinerary booking module may be operable to process itinerary communications received from the plurality of travelers. The itinerary booking module may also determine a plurality of legs included in each received itinerary. The itinerary booking module may also book at least one service provider for each leg of each itinerary. The booking may be executed via the transceiver.

The pact central processing system may also include a unique identifier generator. The unique identifier generator may generate a unique identifier for each of the plurality of travelers. The unique identifier may be transmitted to the associated traveler via the transceiver.

In some embodiments, the unique identifier may include a biometric identifier. The biometric identifier may be transmitted to the pact central processing system from the traveler together with the itinerary communication. In some embodiments, the unique identifier may be dynamic. As such, the unique identifier may change after a predetermined period of time. Such a unique identifier may exhibit one-time password characteristics.

The itinerary booking module may transmit, for each leg of each itinerary, via the transceiver, the generated unique identifier, to the service provider. The itinerary booking module may maintain records of each scheduled booking.

The traveler may transmit personally identifiable information together with the itinerary communication. However, the personally identifiable information may be unavailable to the plurality of service providers.

During the travel of the traveler, the transceiver may receive a traveler validation communication from a service provider. The validation communication may include a unique identifier received from the traveler at the service provider. The itinerary booking module may validate the unique identifier with a previously-received itinerary communication. The itinerary communication may validate the unique identifier and the service provider with stored data to ensure that the traveler is following the itinerary. Upon validation, the itinerary booking module may transmit a validated communication to the service provider that transmitted the traveler validation communication.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. Traveler 102 may schedule itinerary 104. Itinerary 104 may be a schedule of events relating to planned travel. Itinerary 104 may preferably record a travel route. As such, itinerary 104 may include locations to be visited at specific times and transportation methods to move between these locations.

Itinerary 104 may include multiple legs, such as legs 1, 2, 3 and 4. A leg in the itinerary may be movement from a first location to a second location. The movement may be via various transportation methods, such as airplane, car, foot, bus or any other suitable transportation method. The itinerary may include the transportation method in which traveler 102 intends to travel from the first location to the second location.

The itinerary may also include data relating to a location in which the traveler may stay for a period of time. For example, traveler 102 may originate in Paris, France. Traveler 102 may depart using an airplane from an airport in Paris. The airplane may arrive in an airport in Atlanta, Ga., United States. In Atlanta, Ga., traveler 102 may rent a hotel room and a rental car during the stay in Atlanta, Ga. Data relating to the hotel room and rental car may be included in the itinerary.

Itinerary 104 may include legs 1, 2, 3 and 4. Leg 1 may include details relating to travel between location A and location B. Leg 1 may also include details relating to a stay at location B. Leg 2 may include details relating to travel between location B and location C. Leg 2 may also include details relating to a stay at location C. Leg 3 may include details relating to travel between location C and location F. Leg 3 may also include details relating to a stay at location F. Leg 4 may include details relating to travel between location F and location A. Because leg 4 concludes with location A, which is the final destination and/or originating location, leg 4 may or may not include details relating to a stay at location A.

At times, there may be reasons to preserve the privacy of traveler 102 and/or the privacy of itinerary 104. As such, traveler 102 may want to book the itinerary without giving personally identifiable information ("PII") to the service providers, such as hotel agencies, car rental services and airlines. However, the service providers may require minimum PII in order to ensure the security and safety of the service. Therefore, a traveler, such as traveler 102, may subscribe to a PACT central processing system. The PACT central processing system may anonymously book the service providers on behalf of the traveler. The PACT central processing system may also maintain PII associated with the traveler. The PACT central processing system may receive authorization to access financial accounts of the traveler. As such, the service providers may trust the PACT central processing system when anonymously booking a traveler. In some embodiments, the traveler may transmit the itinerary to a financial institution. The financial institution may act as a PACT central processing system. The financial institution may communicate with a PACT central processing system.

Figure 2:
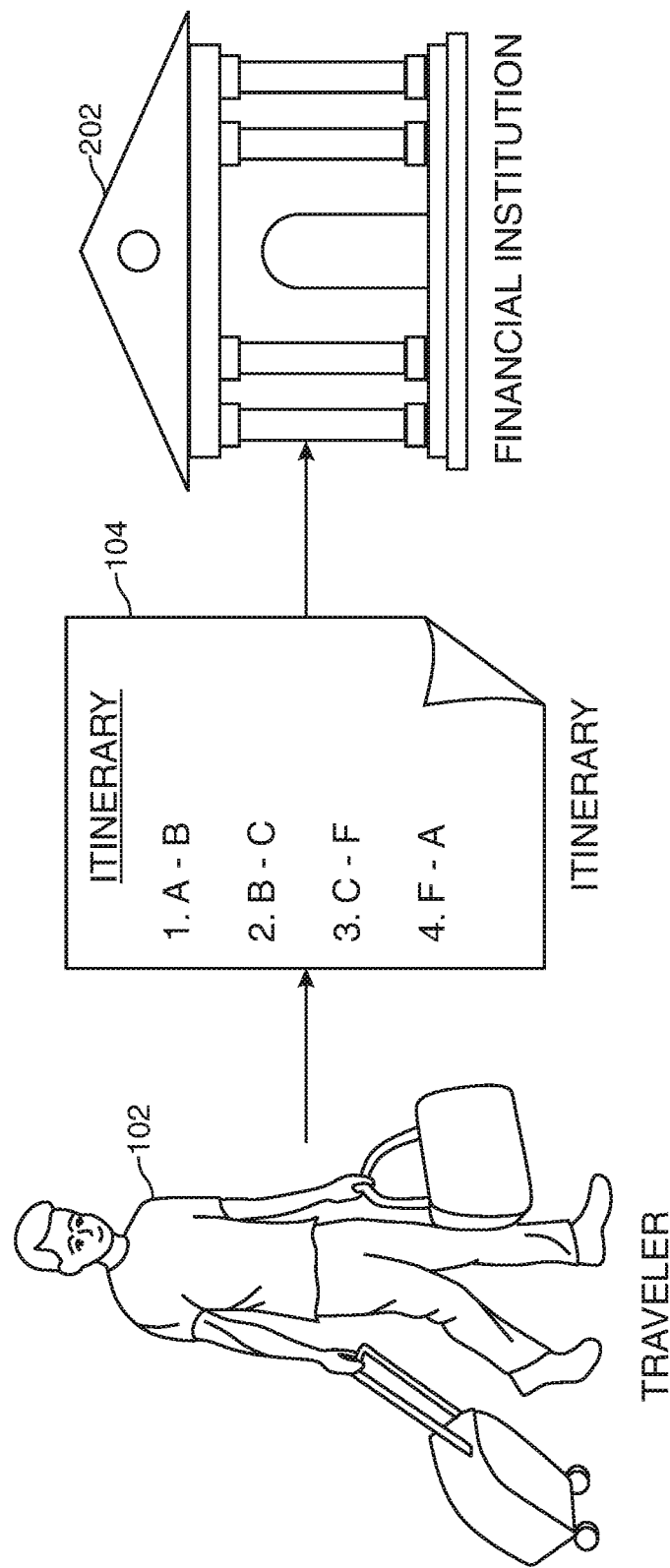
FIG. 2 shows another illustrative diagram in accordance with principles of the disclosure.

FIG. 2 shows an illustrative diagram. Traveler 102 may transmit itinerary 104 to financial institution 202.

Figure 3:
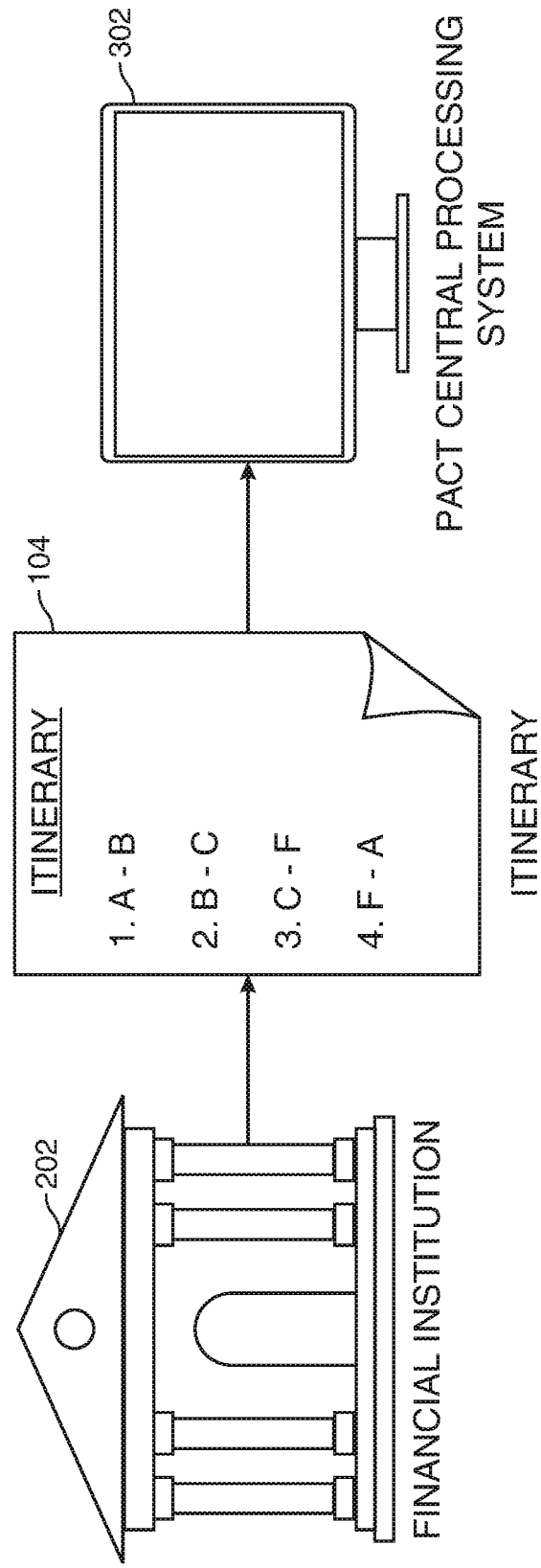
FIG. 3 shows yet another illustrative diagram in accordance with principles of the disclosure.

FIG. 3 shows an illustrative diagram. Financial institution 202 may transmit itinerary 104 to PACT central processing system 302. In addition to the itinerary, financial institution 202 may transmit identifying information relating to traveler 102.

In some embodiments, financial institution 202 may not transmit the traveler's identifying information to PACT central processing system 302. In such embodiments, financial institution 202 may generate a unique identifier that corresponds to the traveler. Financial institution 202 may transmit the unique identifier together with itinerary 104 to PACT central processing system 302. It should be appreciated that PACT central processing system 302 may maintain a level of trust with financial institution 202.

Figure 4:
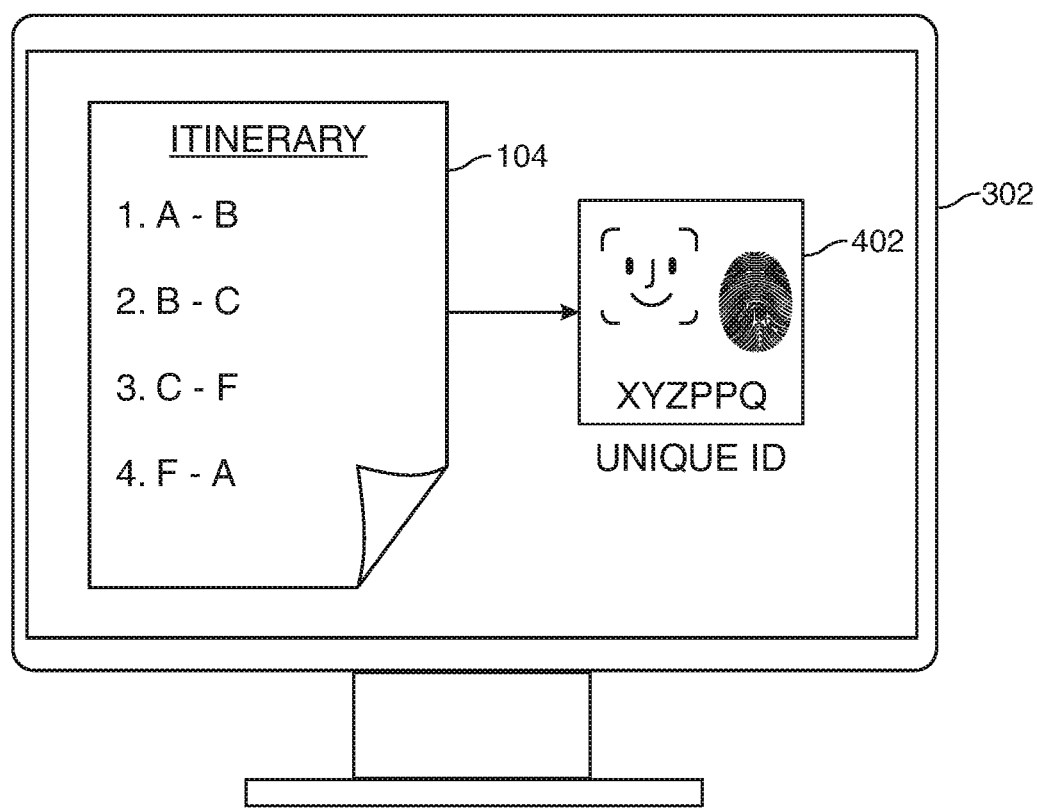
FIG. 4 shows still another illustrative diagram in accordance with principles of the disclosure.

FIG. 4 shows an illustrative diagram. PACT central processing system 302 may link itinerary 104 to unique identifier 402. Unique identifier 402 may be a biometric identifier, such as a fingerprint, face scan, iris scan or any other suitable identifier. Unique identifier 402 may be a non-biometric identifier, such as a unique alphanumeric combination, unique barcode, unique quick response ("QR") code or any other suitable unique non-biometric identifier. Unique identifier 402 may also be a combination of a biometric identifier and a non-biometric identifier. A biometric identifier may be transmitted together with the itinerary from the financial institution to the PACT central processing system.

Figure 5:
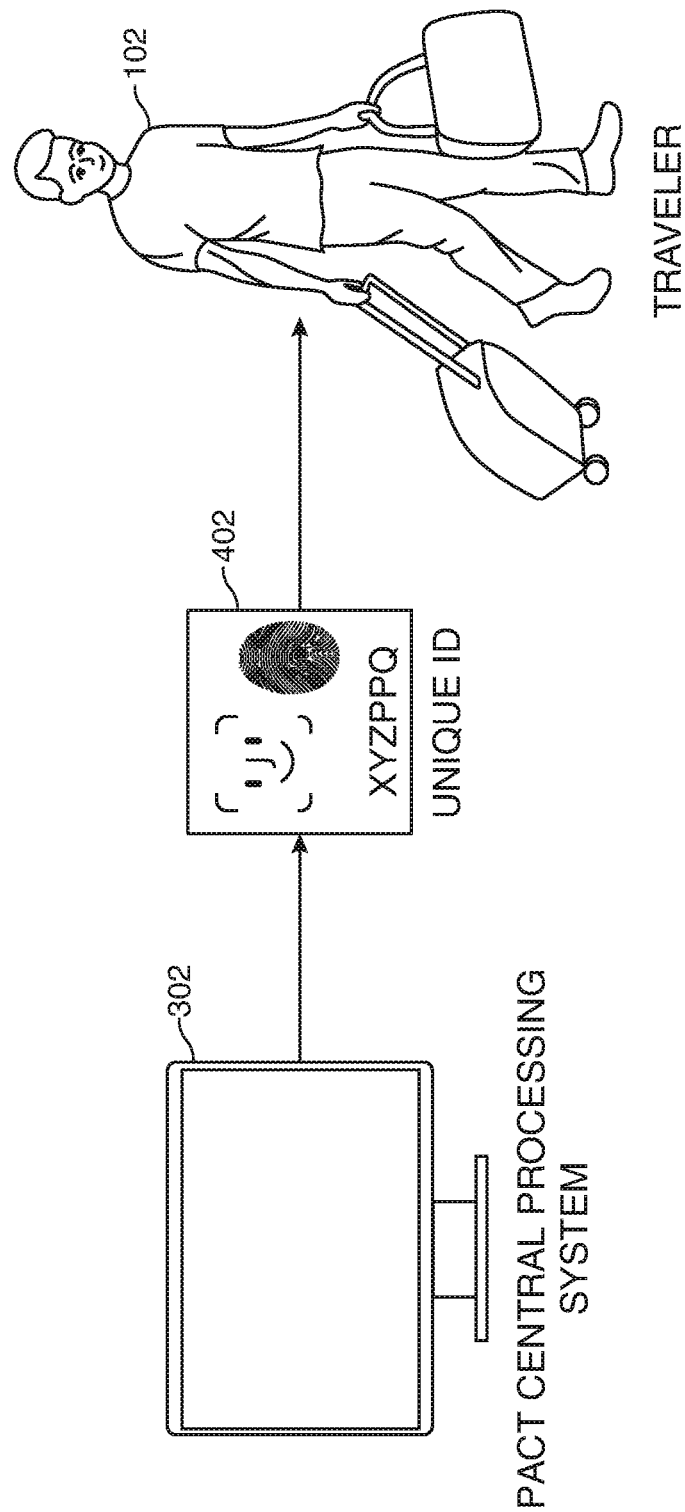
FIG. 5 shows yet another illustrative diagram in accordance with principles of the disclosure.

FIG. 5 shows an illustrative diagram. PACT central processing system 302 may transmit unique identifier 402, or a digital rendition of unique identifier 402, to traveler 102. Traveler 102 may retain the unique identifier for the duration of the trip outlined by the itinerary.

Figure 6:
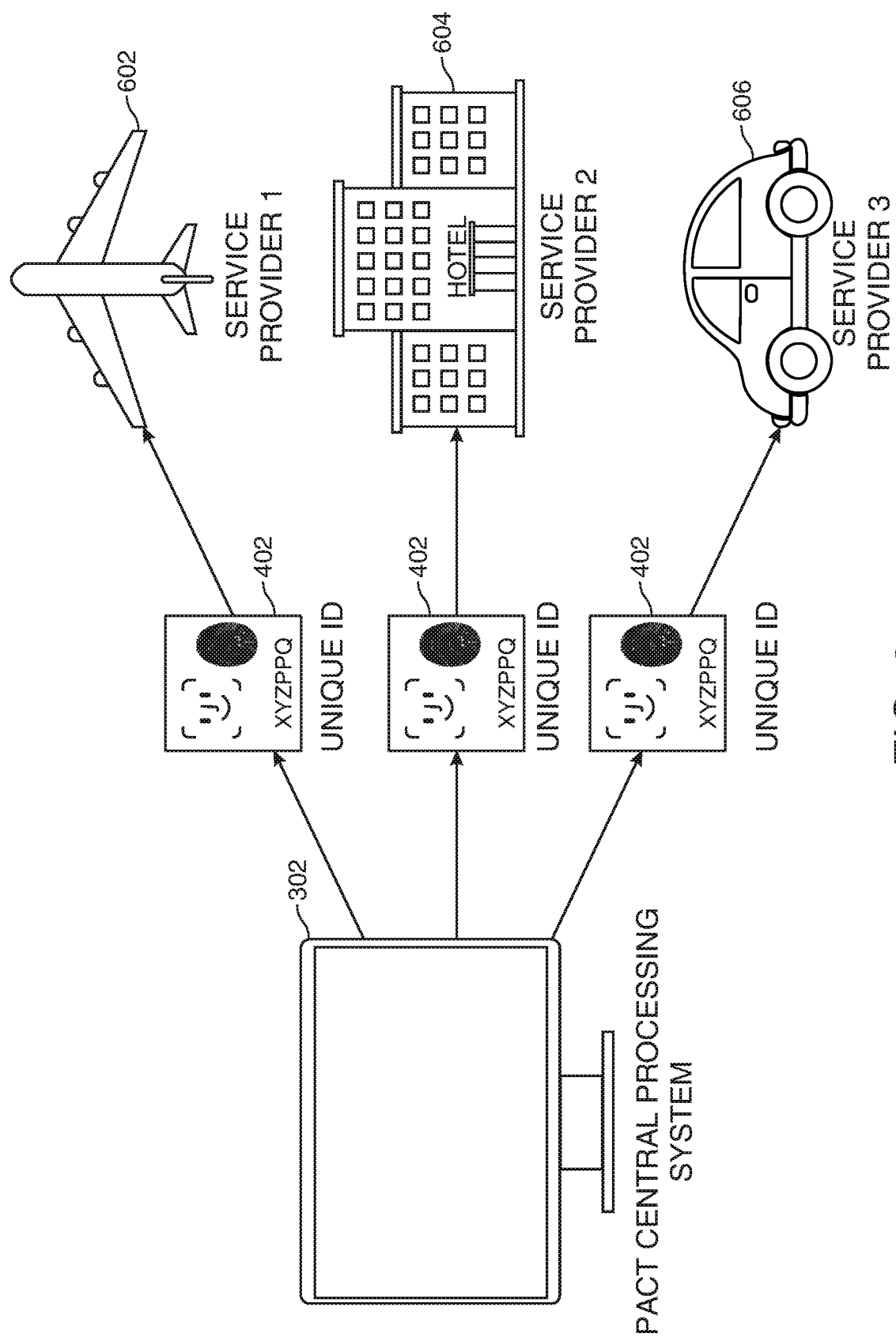
FIG. 6 shows still another illustrative diagram in accordance with principles of the disclosure.

FIG. 6 shows an illustrative diagram. PACT central processing system 302 may book the service providers required for traveler 102 to complete itinerary 104. As shown, PACT central processing system 302 may transmit unique identifier 402 to service provider 1, shown at 602. Service provider 1 may provide air travel services. PACT central processing system 302 may transmit unique identifier 402 to service provider 2, shown at 604. Service provider 2 may provide hotel services. PACT central processing system 302 may transmit unique identifier 402 to service provider 3, shown at 606. Service provider 3 may provide car rental services.

Figure 7:
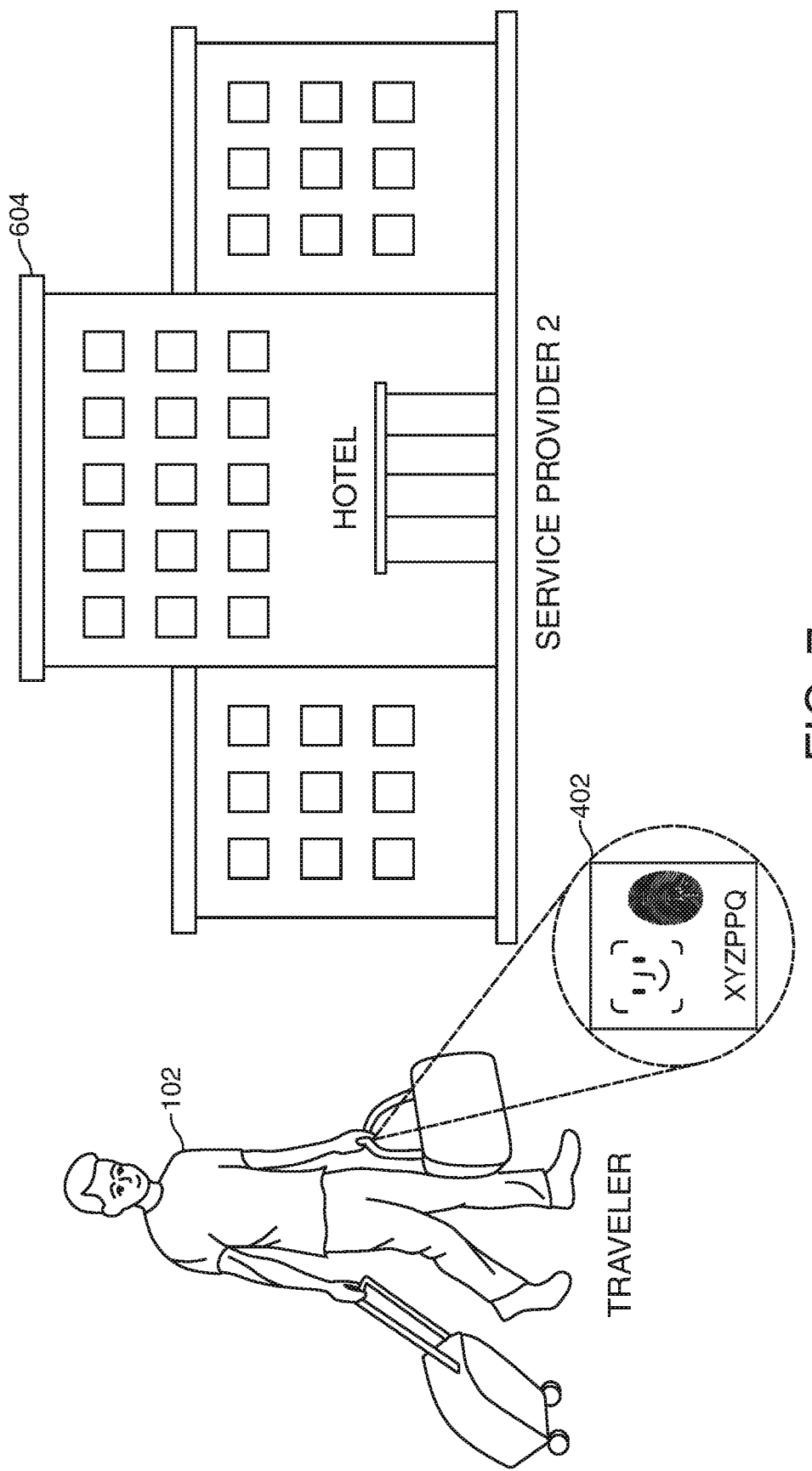
FIG. 7 shows yet another illustrative diagram in accordance with principles of the disclosure.

FIG. 7 shows an illustrative diagram. Traveler 102 may retain the unique identifier while en route on the journey detailed by itinerary 104. Traveler 102 may arrive, with unique identifier 402, at service provider 2, shown at 604. Traveler 102 may present unique identifier 402 in order to check-in to the hotel service provided by service provider 2—e.g., by virtue of a biometric characteristic, or a stored code on a mobile device.

Figure 8:
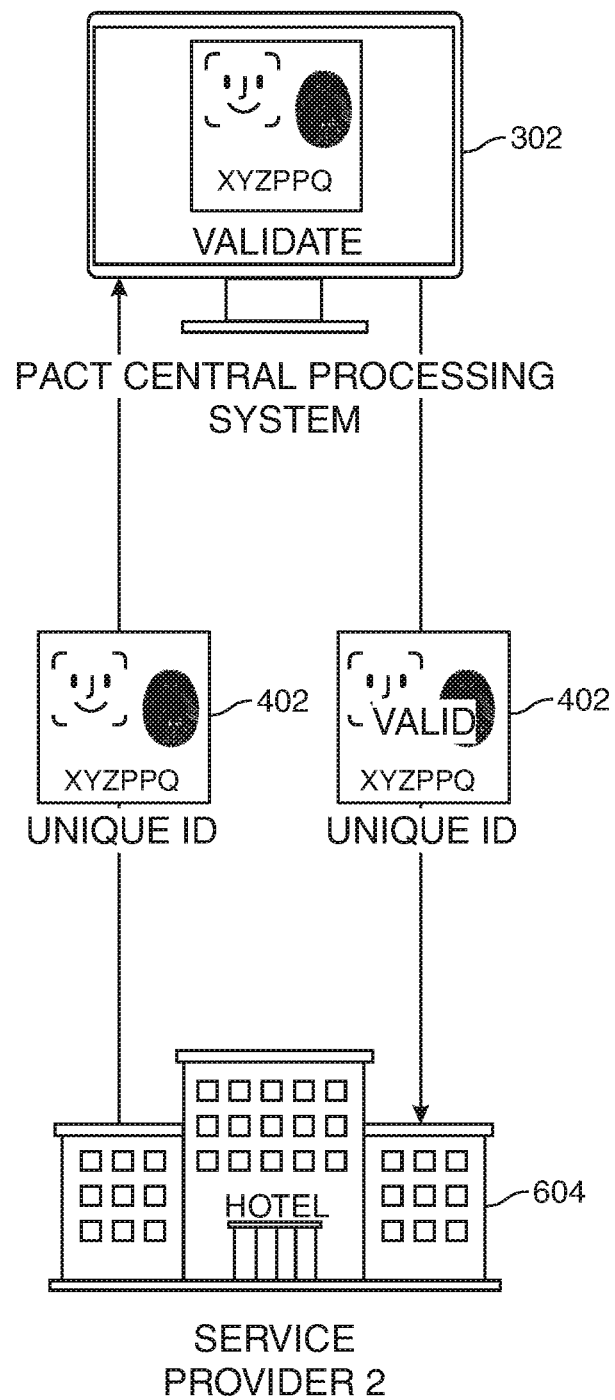
FIG. 8 shows still another illustrative diagram in accordance with principles of the disclosure.

FIG. 8 shows an illustrative diagram. Service provider 2, shown at 604, received unique identifier 402 from traveler 102, as shown in FIG. 7. In order to validate unique identifier 402, service provider 2 may transmit unique identifier 402 to PACT central processing system 302. PACT central processing system 302 may validate unique identifier 402 against stored data. The stored data may include itinerary 104 and unique identifier 402. In the event that service provider 2 is included on itinerary 104 for the time frame in which the unique identifier was received at service provider 2, PACT central processing system 302 may transmit a valid communication to service provider 2. The valid communication may indicate that the bearer of unique identifier 402 is validated to check-in to service provider 2.

Figure 9:
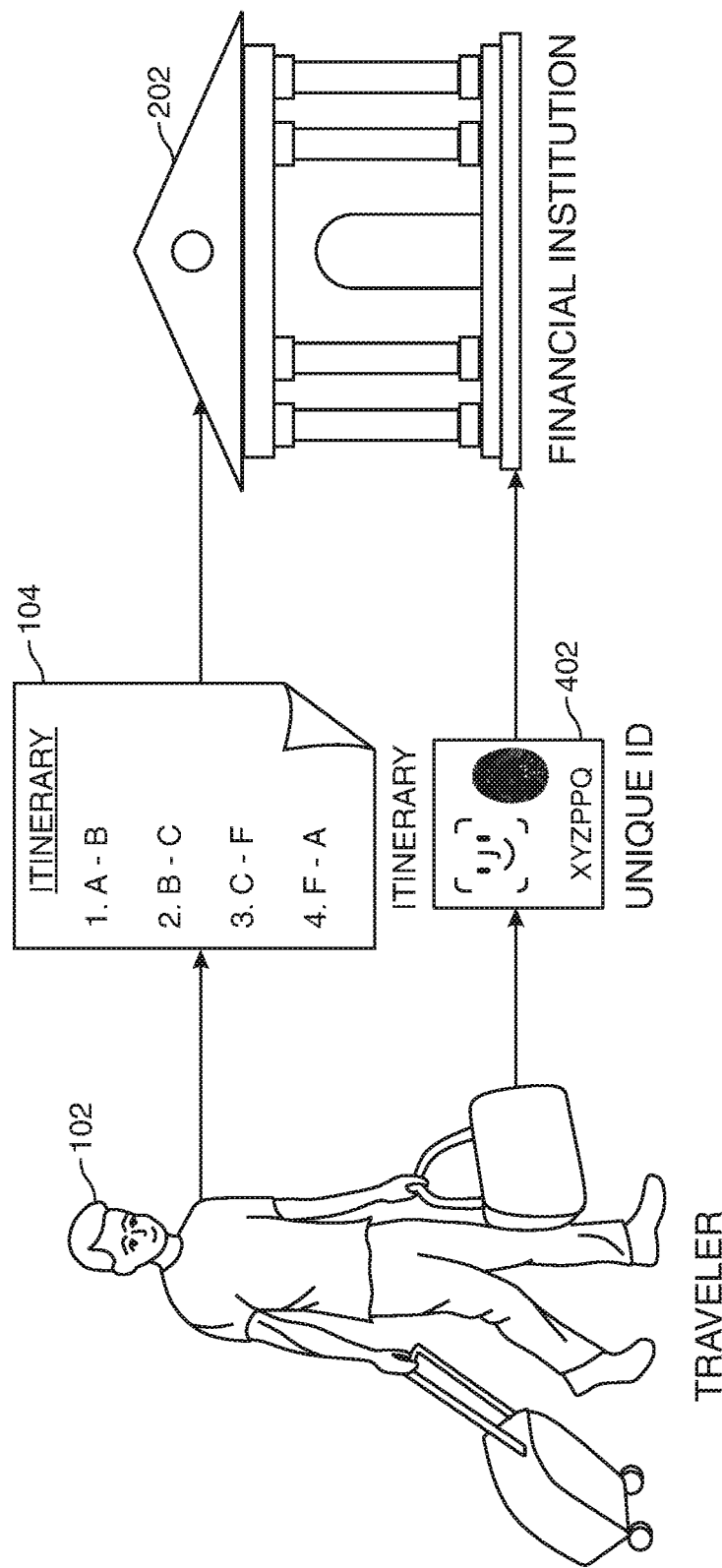
FIG. 9 shows yet another illustrative diagram in accordance with principles of the disclosure.

FIG. 9 shows an illustrative diagram. In the embodiment shown in FIG. 9, traveler 102 may transmit both itinerary 104 and unique identifier 402 to financial institution 202. Unique identifier 402 may be a biometric identifier.

Figure 10:
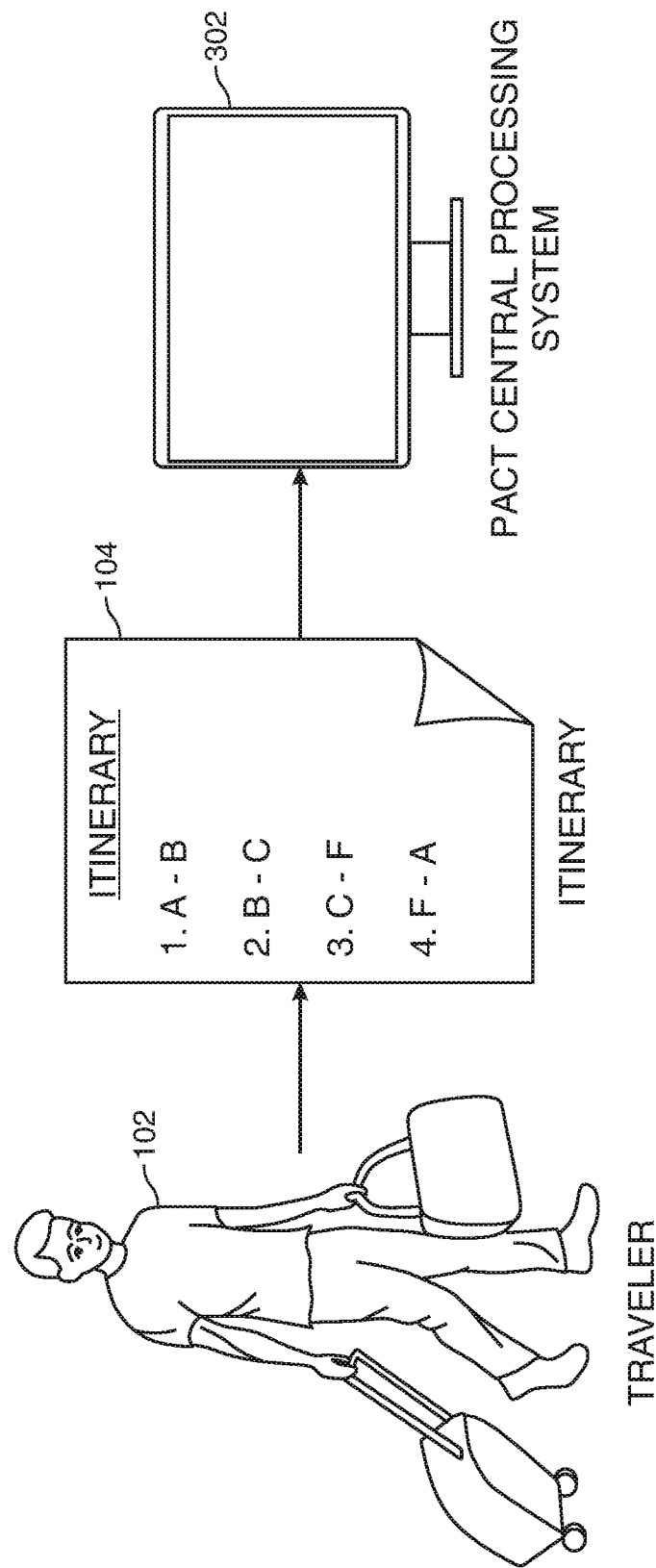
FIG. 10 shows still another illustrative diagram in accordance with principles of the disclosure.

FIG. 10 shows an illustrative diagram. In the embodiment shown in FIG. 10, traveler 102 may transmit itinerary 104 directly to PACT central processing system 302. It may be appreciated that, in such embodiments, a financial institution may be absent from the process flow.

Figure 11:
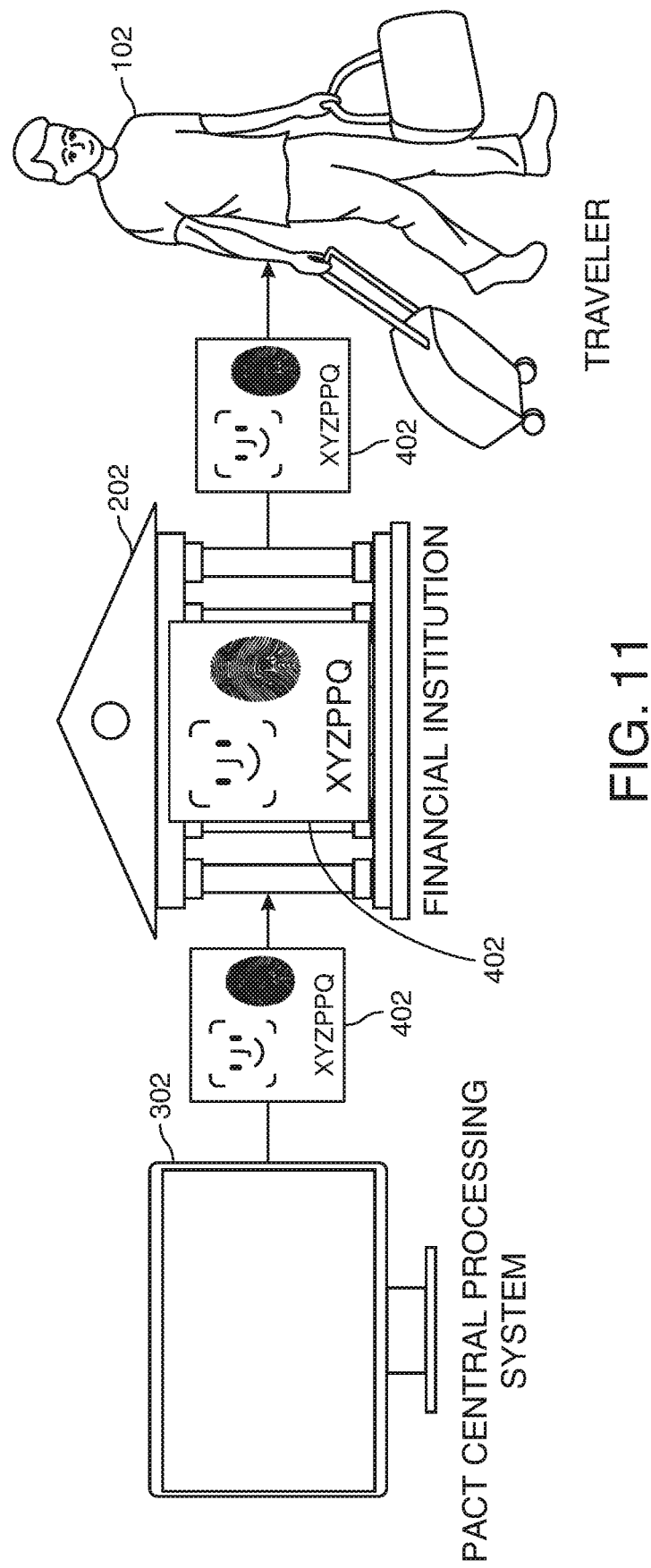
FIG. 11 shows still yet another illustrative diagram in accordance with principles of the disclosure.

FIG. 11 shows an illustrative diagram. In the embodiment shown in FIG. 11, PACT central processing system generates unique identifier 402 for traveler 102, and transmits the unique identifier to traveler 102 via financial institution 202. As such, PACT central processing system 302 may transmit unique identifier 402 to financial institution 202. Financial institution 202 may transmit unique identifier 402 to traveler 102.

Thus, a private, secure travel system is provided. Persons skilled in the art will appreciate that the present invention can be practiced by other than the described embodiments, which are presented for purposes of illustration rather than of limitation. The present invention is limited only by the claims that follow.

What is claimed is:

1. A method for implementing a private, secure travel itinerary, the method comprising:
   receiving the itinerary from a traveler, said itinerary comprising a plurality of legs;
   transmitting the itinerary to a central processing system;
   generating, at the central processing system, a unique anonymous identifier, said unique identifier identifying:
   the itinerary; and
   comprising a biometric identifier associated with the traveler;
   anonymously booking, using the unique identifier, by the central processing system, each leg included in the itinerary, with a service provider, wherein the central processing system uses the unique identifier to book travel services from the service provider without providing the service provider with personal information of the traveler, wherein the unique identifier is dynamic and varies for each leg of the itinerary;
   transmitting, from the central processing system, the unique identifier and a plurality of details relating to the one or more service providers to the traveler; and
   during travel of the traveler, anonymously validating the anonymous booking with the service provider.

2. The method of claim 1 further comprising receiving an electronic input at one of the one or more service providers, corresponding to the unique identifier, from the traveler.

3. The method of claim 2 further comprising the one of the one or more service providers validating the received unique identifier with the central processing system.

4. The method of claim 1 wherein the booking further comprises transmitting the unique identifier to the one or more service providers.

5. The method of claim 4 further comprising deleting the unique identifier from records of the one or more service providers upon successful completion of a service provided by the one or more service providers.

6. The method of claim 1 wherein the one or more service providers comprise airline services, hotel services or car rental services.

7. The method of claim 1 wherein the unique identifier is valid for a predetermined time period.

8. The method of claim 1 further comprising transmitting, to each of the one or more service providers, a leg of the itinerary, said leg of the itinerary being relevant to the service provider to which the leg of the itinerary is being transmitted.

9. A central processing system for private, secure travel itinerary implementation, the system comprising:
- a transceiver, said transceiver operable to receive and transmit communications to a plurality of travelers and a plurality of service providers;
- a unique identifier generator, said unique identifier generator operable to generate a unique identifier for each of the plurality of travelers, where each unique identifier identifies an itinerary for one of the plurality of travelers and comprises a biometric identifier associated with the one of the plurality of travelers; and
- an itinerary booking module, said itinerary booking module operable to:
  - process itinerary communications received from the plurality of travelers; and
  - determine a plurality of legs included in each received itinerary; and
  - anonymously book, using the unique identifier for each of the plurality of travelers, via the transceiver, each leg of each itinerary with at least one service provider from the plurality of service providers, wherein the central processing system uses each unique identifier to book travel services for one of the plurality of travelers from the at least one service provider without providing the at least one service provider with personal information of the one of the plurality of travelers, wherein each unique identifier for each of the plurality of travelers is dynamic and varies for each leg of each received itinerary;
  - transmit each unique identifier and a plurality of details relating to at least one service provider to each of the plurality of travelers; and
  - anonymously validate, during travel of each of the plurality of travelers, the anonymous booking with the at least one service provider.

10. The system of claim 9, wherein, for each leg of each itinerary, the itinerary booking module transmits, via the transceiver, the generated unique identifier to the service provider.

11. The system of claim 9, wherein the unique identifier is unique to the itinerary and the traveler.

12. The system of claim 9, wherein personally identifiable information relating to the plurality of travelers is unavailable to the plurality of service providers.

13. The system of claim 9, wherein the transceiver is further operable to transmit each generated unique identifier to the associated traveler, included in the plurality of travelers.

14. The system of claim 9, wherein the transceiver is operable to receive a traveler validation communication from a service provider, included in the plurality of service providers, said communication comprising a unique identifier received from a traveler.

15. The system of claim 14, wherein the itinerary booking module validates the unique identifier with a previously-received itinerary communication, and transmits a validated communication to the service provider that transmitted the traveler validation communication.

* * * * *